United States Patent
Stotski et al.

(10) Patent No.: US 10,148,611 B2
(45) Date of Patent: Dec. 4, 2018

(54) NETWORK ADDRESS SHARING IN A MULTITENANT, MONOLITHIC APPLICATION ENVIRONMENT

(71) Applicant: EMC Corporation, Hopkinton, MA (US)

(72) Inventors: Yuri Alexandrovich Stotski, St. Petersburg (RU); Vasiliy Mihailovich Tolstoy, St. Petersburg (RU); Sergey Alexandrovich Kovalev, St. Petersburg (RU); Arthur O. Harris, Framingham, MA (US); Mukesh Gupta, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 343 days.

(21) Appl. No.: 15/024,250

(22) PCT Filed: Mar. 30, 2015

(86) PCT No.: PCT/RU2015/000202
§ 371 (c)(1),
(2) Date: Mar. 23, 2016

(87) PCT Pub. No.: WO2016/159813
PCT Pub. Date: Oct. 6, 2016

(65) Prior Publication Data
US 2017/0041288 A1    Feb. 9, 2017

(51) Int. Cl.
*G06F 15/16*    (2006.01)
*H04L 29/12*    (2006.01)
(Continued)

(52) U.S. Cl.
CPC ............ *H04L 61/2038* (2013.01); *G06F 9/44* (2013.01); *G06F 9/5061* (2013.01);
(Continued)

(58) Field of Classification Search
CPC . H04L 61/2038; H04L 61/30; H04L 61/2061; H04L 61/2007; H04L 61/6063;
(Continued)

(56) References Cited

U.S. PATENT DOCUMENTS 9,842,075 B1 *    12/2017    Davis et al. .......... G06F 13/385
2008/0005305 A1 *    1/2008    Hass et al. ............ G06F 15/173
                                                                709/223
(Continued)

FOREIGN PATENT DOCUMENTS

WO    2007111824 A2    10/2007
WO    2014140963 A1    9/2014

*Primary Examiner* — Richard G Keehn
(74) *Attorney, Agent, or Firm* — BainwoodHuang (57) ABSTRACT

Improved techniques of running multitenant applications involve opening sockets in multiple network namespaces through which respective tenants may access a monolithic application thread. A server running such an application may assign tenants network bandwidth through one or more network namespaces. Each network namespace has its own independent set of network addresses that may overlap or even be identical to another namespace's set of network addresses. The server may then identify a request to access application data with a particular tenant by network identifiers such as virtual local area network (VLAN) identifiers attached to the request. Thus, even though two established sockets may include identical source and destination addresses, data may be exchanged between the server and the intended tenants.

15 Claims, 4 Drawing Sheets

(51) Int. Cl.
  *G06F 9/44*      (2018.01)
  *H04L 12/40*     (2006.01)
  *H04L 29/06*     (2006.01)
  *H04L 29/08*     (2006.01)
  *G06F 9/50*      (2006.01)
  *H04L 12/46*     (2006.01)

(52) U.S. Cl.
  CPC ............ *G06F 9/5077* (2013.01); *H04L 12/40* (2013.01); *H04L 12/4641* (2013.01); *H04L 61/2007* (2013.01); *H04L 61/2061* (2013.01); *H04L 61/30* (2013.01); *H04L 61/6063* (2013.01); *H04L 67/10* (2013.01); *H04L 69/162* (2013.01)

(58) Field of Classification Search
  CPC ....... H04L 67/10; H04L 69/162; H04L 12/40; G06F 9/44
  See application file for complete search history.

(56) References Cited

U.S. PATENT DOCUMENTS

| | | |
|---|---|---|
| 2008/0034125 A1 | 2/2008 | Powell et al. |
| 2010/0091681 A1 | 4/2010 | Sonoda |
| 2013/0204971 A1 | 8/2013 | Brandwine et al. |
| 2016/0072919 A1* | 3/2016 | Bailey ................. H04L 41/0806 709/222 |
| 2016/0105393 A1* | 4/2016 | Thakkar et al. ........ H04L 61/30 709/220 |

* cited by examiner

NETWORK ADDRESS SHARING IN A MULTITENANT, MONOLITHIC APPLICATION ENVIRONMENT

BACKGROUND

Software as a service (SaaS) is a software licensing and delivery model in which software is licensed on a subscription basis and is centrally hosted. Users typically access a software application running under SaaS using a thin client via a web browser. To reduce the total costs of ownership (TCO), some software applications running under SaaS allocate users of different customers to the same application instance. A customer representing a closed group, which is usually charged and handled as a single entity, is referred to as a tenant. Applications designed to serve multiple tenants with a single runtime instance are referred as multitenant applications. Multitenancy contrasts with multi-instance architectures in which separate software instances operate on behalf of different tenants.

Some multitenant applications are monolithic. A monolithic application is a software application in which the user interface and data access code are combined into a single program from a single platform. An application may be considered monolithic when it is completely self-contained and does not produce a separate process when serving multiple users.

A conventional approach to running multitenant, monolithic applications allows users to access the applications through specified tenants over a local network in a data center. For example, a monolithic email server in a data center provides a locally connected tenant with a share of the data center's network bandwidth to allow its users access to their respective email accounts. The tenants may represent different companies or different departments of a corporation. The users within these companies or corporate departments then access their email over a network through their respective tenants.

SUMMARY

Unfortunately, there are deficiencies with the above-described conventional approaches to running multitenant, monolithic applications. For example, when a multitenant application is monolithic, the tenants must be assigned nonoverlapping IP address ranges. As a consequence of such a constraint, a server that runs such an application on behalf of individual customers might not be able to meet a customer's specifications regarding network resources. Further, a server operating under such a constraint may not be able to run a network test on the application over actual network addresses that are used by tenants while the production software is running over the network. Along these lines, realistic training exercises may also not be able to be performed while the production software is running over the network.

In contrast with the above-described conventional approaches to running multitenant applications in which customer and testing activity is constrained by network address availability, improved techniques of running multitenant applications involve opening sockets in multiple network namespaces through which respective tenants may access a monolithic application thread. A server running such an application may assign tenants network bandwidth through one or more network namespaces. Each network namespace has its own independent set of network addresses that may overlap or even be identical to another namespace's set of network addresses. The server may then identify a request to access application data with a particular tenant by network identifiers such as virtual local area network (VLAN) identifiers attached to the request. Thus, even though two established sockets may include identical source and destination addresses, data may be exchanged between the server and the intended tenants.

Advantageously, the improved techniques allow a server that runs a monolithic, multitenant application to be able to meet a customer's specifications regarding network resources. Further, the server may carry out more realistic testing and training even while serving production versions of the application to tenants.

One embodiment of the improved techniques is directed to a method of operating multitenant applications over networks. The method includes generating, by processing circuitry of the server device in a context of the operating system, a first network namespace and second network namespace in the context of the operating system, the first network namespace and the second network namespace being distinct from one another. The method also includes opening (i) a first socket within the first network namespace and (ii) a second socket within the second network namespace. The method further includes receiving (i) a first request to access a thread of the application from a first tenant through the first socket and (ii) a second request to access the thread of the application from a second tenant through the second socket, the first tenant and the second tenant being distinct from one another. The method further includes, in response the first request, transferring, by the processor, data generated by the thread of the application to the first tenant through the first socket. The method further includes, in response the second request, transferring, by the processor, data generated by the thread of the application to the second tenant through the second socket.

Additionally, some embodiments are directed to a system constructed and arranged to operate multitenant applications over networks. The system includes a network interface coupled to a network, memory, and controlling circuitry coupled to the memory. The controlling circuitry is constructed and arranged to carry out a method of operating multitenant applications over networks.

Further, some embodiments are directed to a computer program product having a non-transitory, computer-readable storage medium which stores executable code, which when executed by a computer, causes the computer to perform a method of operating multitenant applications over networks.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of running multitenant applications involve opening sockets in multiple network namespaces through which respective tenants may access a monolithic application thread. Advantageously, the improved techniques allow a server that runs a monolithic, multitenant application to be able to meet a customer's specifications regarding network resources.

Figure 1:
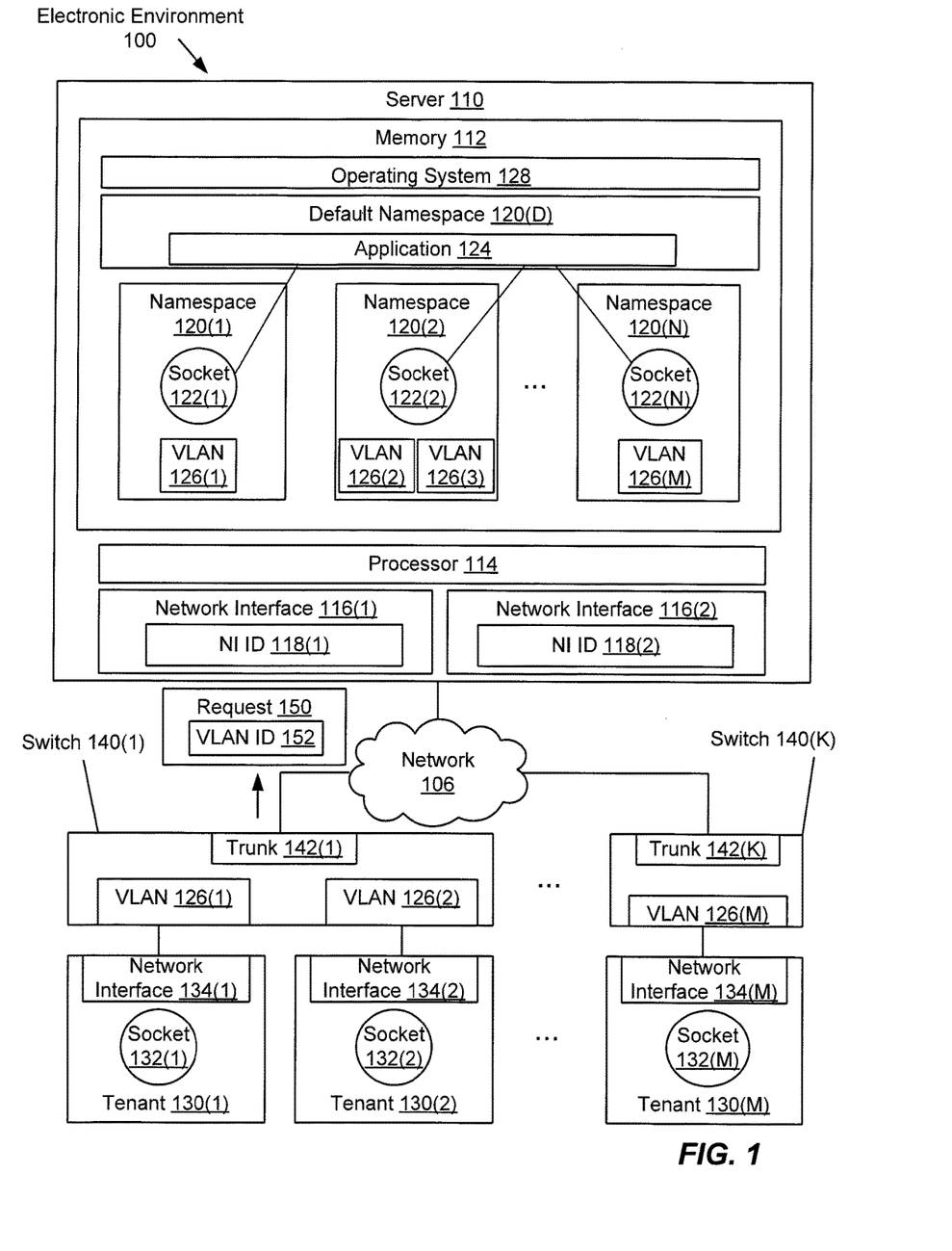
FIG. 1 is a block diagram illustrating an example electronic environment in which the improved technique can be carried out.

FIG. 1 shows an example electronic environment 100 in which embodiments of the improved techniques hereof can be practiced. Within electronic environment 100, a server computing device, shown as server 110, is configured to provide access to a monolithic, multitenant application 124 to multiple tenants 130(1), 130(2), . . . , 130(M) over a network 106 via switches 140(1), . . . , 140(K) (i.e., some switches may serve more than one tenant). The server 110 as illustrated in FIG. 1 includes memory 112, a processor 114 coupled to the memory 112, and network interfaces 116(1) and 116(2). It should be understood, however, that the server 110 may contain any number of network interfaces, e.g., 1, 3, 4, 5, or more.

The network 106 provides network connections between the server 110 and the tenants 130(1), 130(2), . . . , 130(M) via the network interfaces 116(1) and 116(2) and the switches 140(1), . . . , 140(K). The network 106 may implement any of a variety of protocols and topologies that are in common use for communications over the internet. Furthermore, the network 106 may include various components (e.g., cables, switches/routers, gateways/bridges, etc.) that are used in such communications. The network 106 may also take the form of a local area network (LAN), a wide-area network (WAN), or the like.

The memory 112 may include both volatile memory (e.g., RAM) and no-volatile memory (e.g., one or more flash drives and/or disk drives). The memory 112 is configured to store various software constructs containing executable code that, when executed by the processor 114, causes the processor 114 to perform various operations. As illustrated in FIG. 1, the memory 112 stores an operating system 128 such as Linux, and the application 124, which is configured to run in the context of the operating system 128.

The operating system 128 is configured in part to provide the server 110 with the ability to exchange data with the tenants 130(1), 130(2), . . . , 130(M), over the network 106. This ability derives from a set of network parameter values defined by a default network namespace 120(D). For example, the default network namespace 120(D) defines a routing table that the server 110 uses to route data packets over the network 106. In principle, the server 110 may exchange data with a tenant at one of the network addresses specified by the routing table. It should be understood, however, that the network addresses assigned to the tenant are provided by an administrator as part of establishing the tenant within the network 106.

In order to enable the server to provide different tenants, e.g., tenants 130(1) and 130(2), with the same network addresses that may be used at the same time, the operating system 128 is configured to provide multiple network namespaces 120(1), 120(2), . . . , 120(N) as needed, e.g., for each tenant 130(1), 130(2), . . . , 130(M). Each network namespace, e.g., network namespace 120(1), is a software construct in the context of the operating system 128 that provides an independent set of network parameter values that stands apart from those defined in the default network namespace 120(D). Specifically, each network namespace, e.g., network namespace 120(1), defines its own routing table. Accordingly, network namespace 120(1) may provide a tenant, e.g., tenant 130(1), with its own range of network addresses, while network namespace 120(2) may provide another tenant, e.g., tenant 130(2), with its own range of network addresses. The ranges of network addresses provided by network namespaces 120(1) and 120(2) may have overlapping network addresses.

Each network namespace, e.g., network namespace 120(1), provides an instance of a respective socket, e.g., socket 122(1). An open socket such as socket 122(1) is defined by a network address, a port (e.g., 80), and a network protocol (e.g., TCP). The network address of socket 122(1) is the network address used by the network namespace 120(1). The socket 122(1) provides a virtual channel by which communications may be established with a tenant, e.g., tenant 130(1). Along these lines, the server 110 "listens" for requests to access application data through an open socket in a network namespace.

Each network namespace, e.g., network namespace 120(1), may be associated with a number of virtual networks. For example, when the environment 100 represents a data center, each virtual network may be a virtual local area network (VLAN). As illustrated in FIG. 1, network namespace 120(1) has a single VLAN interface 126(1). However, network namespace 120(2) has two VLAN interfaces 126(2) and 126(3). A network namespace having multiple VLAN interfaces has its network address range distributed among multiple VLANs. In some arrangements, a tenant may span several VLANs. Further, a tenant may span several physical LANs (e.g., VxLANs).

Each VLAN interface 126 in turn may correspond to a respective tenant. Along these lines, each VLAN interface 126 is associated with a value of a VLAN identifier 152. For example, when the operating system 128 is Linux, VLAN identifiers 152 may take values such as "12", "34", and so on. The values of the VLAN identifiers 152 may thus be used to direct communications between a tenant 130 and a network namespace 120. In some arrangements, the VLAN identifiers 152 conform to the IEEE 802.1q standard, in which VLAN identifiers 152 may take values between 0 and 4096.

The processor 114 may include one or more CPUs containing multiple cores, e.g., an Intel Xeon® chip. The processor 114 and the memory 112 together form controlling circuitry, which is constructed and arranged to carry out the various methods and functions as described herein. Alternatively, there may be circuitry directly configured to carry out these methods and functions.

Each network interface, e.g. network interface 116(1), includes, for example, adapters such as SCSI target adapters and network interface adapters for converting electronic and/or optical signals received from the network 106 to electronic form for use by the server 110. Further, each network interface, e.g. network interface 116(1), is respectively associated with a value of a network interface identifier 118(1) and 118(2) that identifies data received at the server with the network interface through which the data was received. For example, when the operating system 128 is a Linux OS, network interface identifier 118(1) may be "eth0" and network interface identifier 118(2) may be "eth1".

Each tenant, e.g., tenant 130(1), is a server device that is configured to provide remote, individual users access to application data. In some arrangements, however, some tenants may take the form of a collection of connected devices. In order to provide data to a certain number of users at one instant of time, the tenant 130(1) must be provided with a minimum number of network addresses by a namespace, e.g., namespace 130(1). The server 110 provides this number of network addresses to the VLAN interface 126(1) through which the network namespace 120(1) may exchange data with tenant 130(1). Tenant 130(1), as an example, includes a respective network interface, e.g., network interface 134(1).

Alternatively, tenant 130(1) may represent a production system used to obtain production data from the application 124. In this case, tenant 130(2) may represent a test system used for learning about the effect of various network settings on the quality of service. In this example, it is desirable that the test system be able to utilize the same network parameter values (e.g., network addresses) as those used in the production system. The improved techniques described herein allow such a test system to run simultaneously with the production system without any limits as to bandwidth or timing.

Each network interface, e.g., network interface 134(1), includes, for example, adapters such as iSCSI target adapters and network interface adapters for converting electronic and/or optical signals received from the network 106 to electronic form for use by the server 110.

Each tenant, e.g., tenant 130(1), provides an instance of a respective socket, e.g., socket 132(1) within its default namespace. As opposed to the socket 122(1) provided by the network namespace 120(1), the socket 132(1) is not configured to "listen" but seek out its respective open socket 122(1) in order to establish the socket. An established socket contains a server network address, a tenant network address, a server port, a tenant port, and a protocol (i.e., TCP) and enables bidirectional communications.

It should be understood that, within the environment 100, two established sockets that have identical server network addresses, tenant network addresses, server ports, and tenant ports may operate simultaneously. This is a consequence of each namespace having its own range of network addresses.

Each switch 140(1), . . . , 140(K) may support one or more tenants. Accordingly, a switch such as switch 140(1) that supports multiple tenants has multiple ports, each port through which a tenant connects to the switch 140(1) is associated with a VLAN having a value of the VLAN identifier. Further, each switch, e.g., switch 140(1) also has a trunk, e.g., trunk 142(1) through which communications from each port is directed to a network interface of the server 110 via the network 106. Because each port tags a data packet with its value of the VLAN identifier, each communication that passes through the trunk 142(1) may be directed to its proper destination.

In some arrangements, two data packets tagged with the same value of a VLAN identifier may still find their way to their respective destinations because the two packets arrive at the server 110 via different network interfaces. However, no two data packets may have the same values of the VLAN identifier and the network interface identifier.

During operation, the server 110 generates network namespaces 120(1), 120(2), . . . , 120(N) according to specified service contracts with customers represented by tenants 130(1), 130(2), . . . , 130(M). For example, a first customer may require a large amount of network bandwidth and, accordingly, an entire range of network addresses provided by the network namespace 120(1). However, a second customer may require a small amount of network bandwidth and, accordingly, a fraction of the range of network addresses provided by the network namespace 120(2).

The server 110 then creates a VLAN interface, e.g., 126(1) and moves the created VLAN interface 126(1) to the network namespace 120(1). In some arrangements, the server moves multiple created VLAN interfaces to a single network namespace, e.g., VLAN interfaces 120(2) and 120 (3) to network namespace 120(2).

Once the network namespaces 120(1), 120(2), . . . , have been created, the server then opens a respective socket in each network namespace in order to listen for incoming communications from respective tenants. Such incoming communications will specify a VLAN identifier. For example, the port of a switch, e.g., switch 140(1), tags a connection request 150 from the tenant 140(1) with the value 152 of the VLAN identifier specified by the its VLAN interface 126(1). Once the request reaches the socket 122(1), an established socket may be formed when the socket 122(1) accepts the connection request 150.

Once the socket 122(1) has been established with socket 132(1), then bidirectional communications between the network namespace 120(1) and the tenant 130(1), for example, may commence. For instance, the tenant 130(1) may request data from the application 124 over this established socket 122(1)/132(1), while the processor 114 may return the requested data back over the established socket 122(1)/132 (1).

However, it should be understood that, when the sockets are TCP sockets and the operating system is Linux, the operating system 128 causes the processor 114 to generate an additional socket within the network namespace 120(1). In this case, data transfer occurs through a socket pair consisting socket 120(1) and the additional socket.

Figure 2:
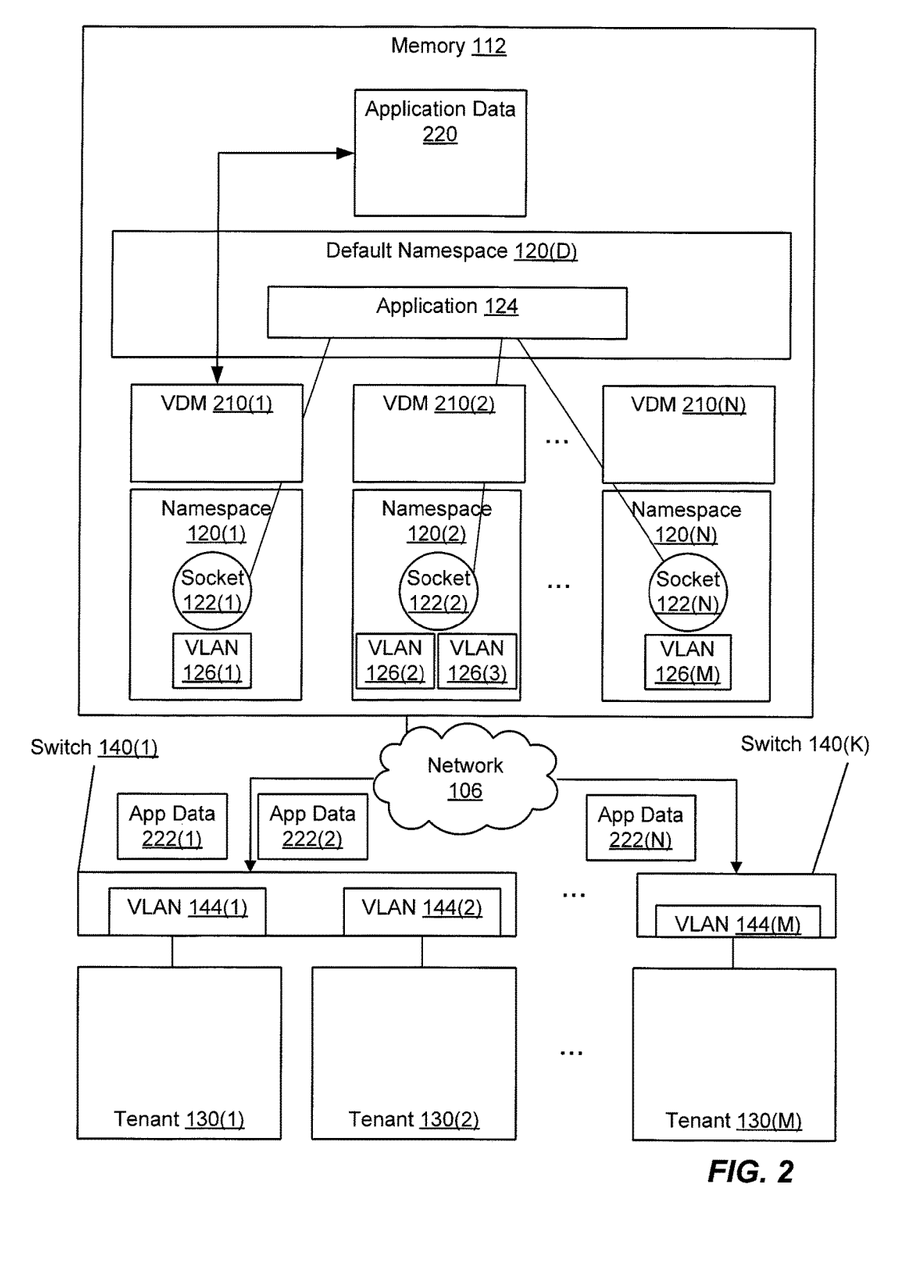
FIG. 2 is a block diagram illustrating an example server memory arrangement for presenting application data to tenants within the electronic environment illustrated in FIG. 1.

FIG. 2 illustrates an example configuration of the server 110 in connection with the improved techniques described herein. As described above in connection with FIG. 1, the memory 112 of the server 110 may be configured to store data from application 124, shown in FIG. 2 as application data 220. However, there needs to be an efficient mechanism for presenting the application data 220 to the tenants 130(1), . . . via the sockets in respective network namespaces.

We have found that the provision of a virtual data mover (VDM) 210(1), 210(2), . . . , 210(N) respectively to each network namespace 120(1), 120(2), . . . , 120(N) effects such a mechanism. For example, each VDM 210(2), . . . , 210(N) may present application data to a respective tenant using a network file system (NFS) interface over the established socket. In this case, users accessing the tenant 130(1) may view their tenant-specific application data 220 using a simple, graphical interface in a browser window. No other tenant may view that tenant-specific data.

It should be understood that each VDM 210 is created by the server 110 as part of the generation of its respective network namespace. However, in order to access the application data 220, each VDM 210 resides within the default namespace 120(D). Thus, the VDM 210(1) acts as a conduit for the application data 220 to flow between the default namespace 120(D) and the established socket 122(1) within the network namespace 120(1). Further, the VDM 210 is able to easily access application data 220 because all server applications, such as application 124, reside in the same file, process ID, and memory namespaces. Thus, while some parts of such applications may reside in the network namespace, all parts reside other types of namespaces. In this way, the improved techniques described here allow the same backend to be shared between different networks.

Figure 3:
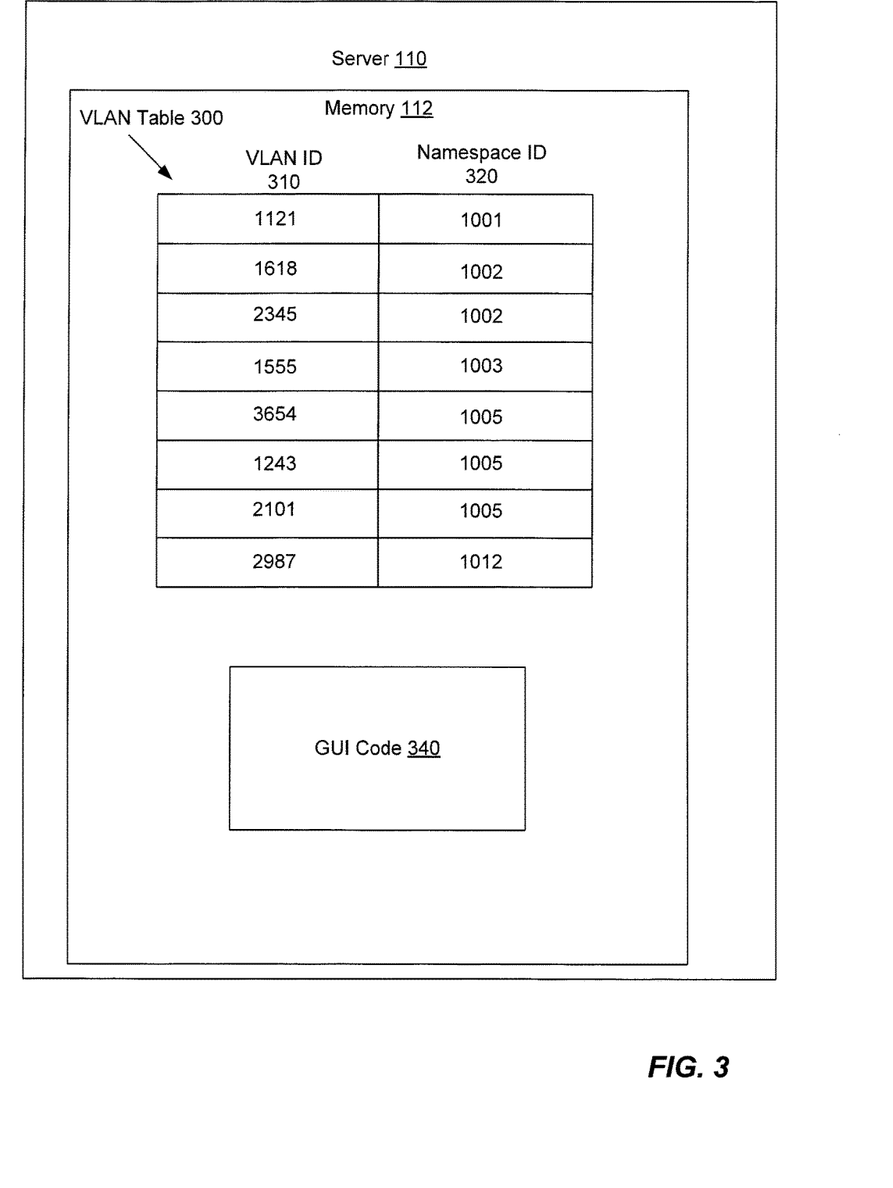
FIG. 3 is a block diagram illustrating an example VLAN table for associating VLANs with network namespaces within the electronic environment illustrated in FIG. 1.

FIG. 3 illustrates another example configuration of the server 110. In this example, the server stores a VLAN table 300 in the memory 112. The VLAN table 300 maps values of the VLAN identifier 310 to values of a namespace identifier 320 identifying a network namespace, e.g., network namespace 120(1) (FIG. 1). In the example shown in FIG. 3, a connection request containing a value of the VLAN identifier of 1121 would be routed to the namespace identified by the namespace identifier having the value 1001.

During an example operation, upon receipt of a connection request, the processor 114 extracts the value of the VLAN identifier from the connection request and locates an entry in the VLAN table 300 that has that value of the VLAN identifier. If such an entry is located, then the processor extracts the value of the namespace identifier and routes the request to the namespace identified by that value. However, if no such entry is found, the processor may throw an exception and notify the tenant which sent the request. In other arrangements, however, no such notification is sent.

FIG. 3 further illustrates the memory 112 storing code containing instructions for the display of a graphical user interface (GUI) on a display (not shown) connected to the server 110. The GUI allows an administrator of the server 110 to associate VLAN interfaces with their namespaces. For example, the administrator may associate a new VLAN identifier with either a new or existing network namespace. Further, the administrator may remove an association between a VLAN interface and a network namespace. Upon the addition or removal of such an association, the processor 114 respectively adds a new entry to the VLAN table 300 or deletes an existing entry from the VLAN table 300.

Figure 4:
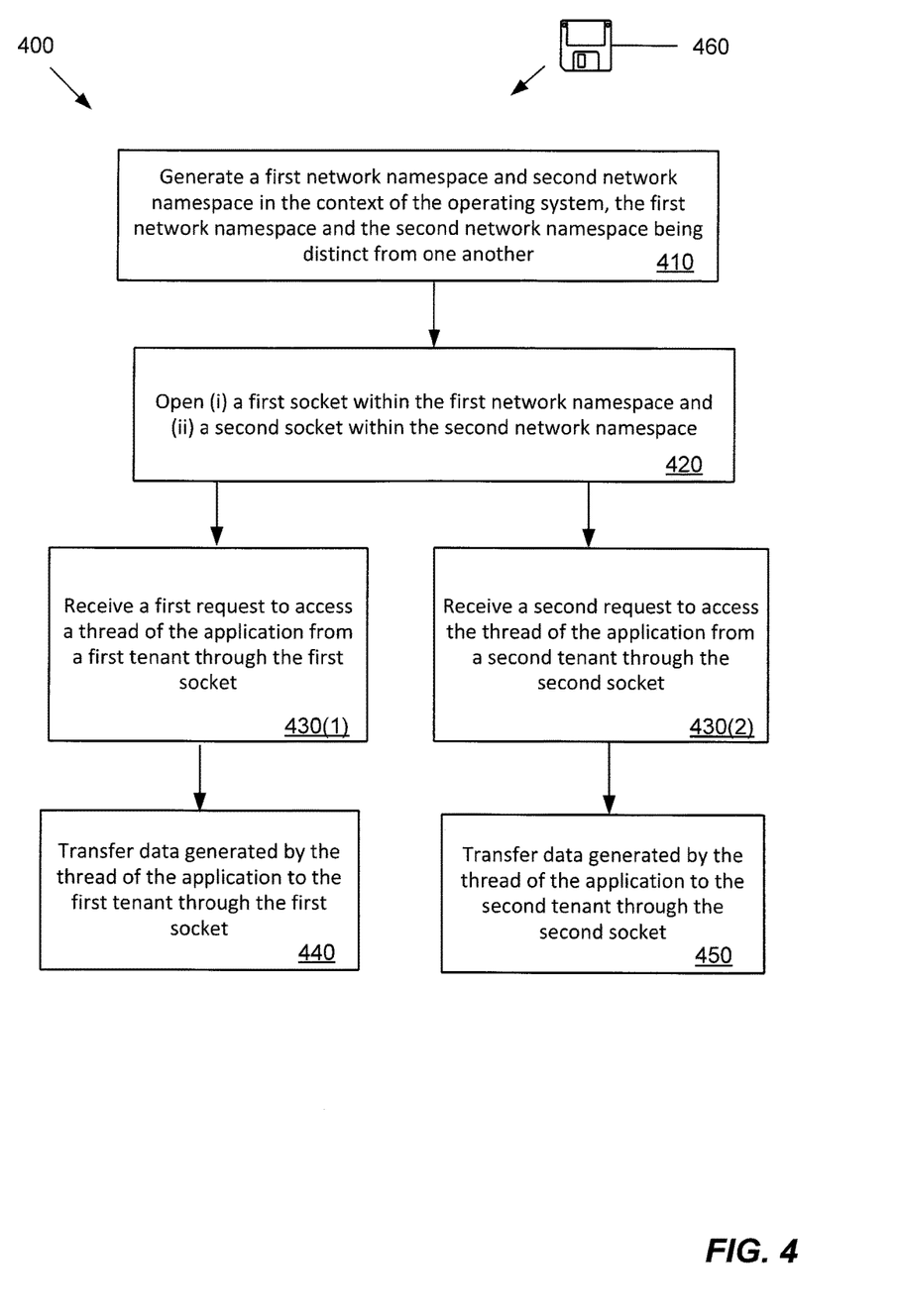
FIG. 4 is a flow chart illustrating an example method of carrying out the improved technique within the electronic environment illustrated in FIG. 1.

FIG. 4 illustrates an example method 400 of operating a monolithic, multitenant application on a server device, the application being run on the server device over a network and provides a summary of some of the material presented above. The process 400 may be performed by the software constructs described in connection with FIGS. 1-3, which reside in the memory 122 of the server 110. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At 410, the processor 114 generates a first network namespace 120(1) and second network namespace 120(2) in the context of the operating system 128. For example, processor 114 may generate such network namespaces in response to customer requests. The network parameter values defining the network namespaces derive from a service order specifying an amount of bandwidth or other suitable quantity (e.g., number of IP addresses, dynamic routing configuration, firewall settings, etc.) the customer should have at any one instant of time.

At 420, the processor 114 opens (i) a first socket within the first network namespace and (ii) a second socket within the second network namespace. Each of these sockets listens for connection requests from tenants.

At 430(1), the processor 114 receives a first request to access a thread of the application from a first tenant through the first socket; at 430(2), the processor 114 receives a second request to access a thread of the application from a second tenant through the second socket. For example, each request by a tenant seeking to establish their respective sockets is tagged with a value of a VLAN identifier defined by the VLAN interface at the port to which the tenant connects. Upon receiving the request via a network interface of the server, the processor 114 extracts the value of the VLAN identifier and maps that value to a value of the namespace identifier according to the VLAN table 300.

At 440(1), the processor 114 transfers data generated by the thread of the application to the first tenant through the first socket; at 440(2), the processor 114 transfers data generated by the thread of the application to the second tenant through the second socket. For example, once the processor 114 establishes the socket, the tenant and the server may exchange data without further delay.

Having described certain embodiments, numerous alternate embodiments or variations can be made. For example, in one alternative configuration, there may be only a single VDM for all network namespaces.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of operating a monolithic, multitenant application on a server device, the application being run on the server device from a default namespace in a context of an operating system over a network, the method comprising:

generating, by processing circuitry of the server device, a first network namespace and second network namespace in the context of the operating system, the first network namespace and the second network namespace being distinct from one another;

opening (i) a first socket within the first network namespace and (ii) a second socket within the second network namespace;

receiving (i) a first request to access a thread of the application from a first tenant through the first socket and (ii) a second request to access the thread of the application from a second tenant through the second socket, the first tenant and the second tenant being distinct from one another;

transferring, by the processor, data generated by the thread of the application to the first tenant through the first socket; and transferring, by the processor, data generated by the thread of the application to the second tenant through the second socket;

wherein:

the first network namespace has a first network address within a first virtual network and the second network namespace has a second network address within a second virtual network;

generating the first network namespace includes allocating a first range of network addresses within the first virtual network to the first tenant;

generating the second network namespace includes allocating a second range of network addresses within the second virtual network to the second tenant; and the first range of network addresses and the second range of network addresses have at least one network address in common.

2. A method of operating a monolithic, multitenant application on a server device, the application being run on the server device from a default namespace in a context of an operating system over a network, the method comprising:

generating, by processing circuitry of the server device, a first network namespace and second network namespace in the context of the operating system, the first network namespace and the second network namespace being distinct from one another;

opening (i) a first socket within the first network namespace and (ii) a second socket within the second network namespace;

receiving (i) a first request to access a thread of the application from a first tenant through the first socket and (ii) a second request to access the thread of the application from a second tenant through the second socket, the first tenant and the second tenant being distinct from one another;

transferring, by the processor, data generated by the thread of the application to the first tenant through the first socket; and transferring, by the processor, data generated by the thread of the application to the second tenant through the second socket;

wherein generating the first network namespace and the second network namespace includes:

producing a first set of virtual local area network (VLAN) interfaces within the first network namespace, each of the first set of VLAN interfaces having a respective value of a VLAN identifier, the VLAN identifier identifying a VLAN over which data may be transported between a tenant and a namespace of the server; and producing a second set of VLAN interfaces within the second network namespace, each of the second set of VLAN interfaces having a respective value of the VLAN identifier;

wherein the first request has a first value of the VLAN identifier and the second request has a second value of the VLAN identifier; and wherein the method further comprises:

routing the first request to one of the first network namespace and the second network namespace according to the first VLAN identifier; and routing the second request to one of the first network namespace and the second network namespace according to the second VLAN identifier.

3. A method as in claim 2, wherein the server includes a set of network interfaces configured to receive requests from tenants, each of the network interfaces having a value of a network interface identifier identifying that network interface;

wherein receiving the first request to access the thread of the application from the first tenant through the first socket includes obtaining a first value of the network interface identifier;

wherein receiving the second request to access the thread of the application from the second tenant through the second socket includes obtaining a second value of the network interface identifier;

wherein routing the first request includes sending the first request to one of the first network namespace and the second network namespace according to the first value of the VLAN identifier and the first value of the network interface identifier; and wherein routing the second request includes sending the second request to one of the first network namespace and the second network namespace according to the second value of the VLAN identifier and the second value of the network interface identifier.

4. A method as in claim 2, wherein generating the first network namespace and the second network namespace further includes configuring the monolithic application to generate a first virtual data mover (VDM) serving the first network namespace and a second VDM serving the second network namespace, each of the first VDM and second VDM being configured to extract application data from a storage device and respectively present the extracted application data to the first tenant and the second tenant, each of the first VDM and second VDM being run by the server within the default namespace within the server.

5. A method as in claim 2, wherein generating the first network namespace and the second network namespace further includes creating a VLAN table, the VLAN table having entries, each entry of the VLAN table including a value of a namespace identifier identifying a network namespace and a value of the VLAN identifier;

wherein receiving the first request includes accessing an entry of the VLAN table that includes the first value of the VLAN identifier; and wherein routing the first request to one of the first network namespace and the second network namespace includes sending the first request to the network namespace identified by the value of the namespace identifier of the accessed entry.

6. A method as in claim 5, further comprising displaying the entries of the VLAN table in a graphical user interface (GUI) within a window generated by the operating system, the GUI including a control that enables an administrator of the server to add or delete a VLAN identifier from a network namespace.

7. A method as in claim 5, wherein the first tenant represents a production system and the second tenant represents a test system, the production system being used by external customers and having a first set of network addresses in the first virtual network, the test system being used internally for experimentation and having a second set of network addresses in the second virtual network, the first set of network addresses and the second set of network addresses each having at least one address in common;

wherein the production system connects to the network at a production port of a switch and the test system connects to the network at a tenant port of the switch;
wherein producing the first set of VLAN interfaces within the first network namespace includes:
    storing a production value of the VLAN identifier in a first entry of the VLAN table, the first entry also having the first value of the network namespace identifier identifying the first network namespace; and
    assigning the production value of the VLAN identifier to the production port so that requests from the production system may be routed respectively to the first network namespace when the requests originate from the at least one address in common; and
wherein producing the second set of VLAN interfaces within the second network namespace includes:
    storing a tenant VLAN identifier in a second entry of the VLAN table, the second entry also having the second value of the network namespace identifier; and
    assigning the tenant VLAN identifier to the tenant port so that requests from the tenant system may be routed to the second namespace when the requests originate from the at least one address in common.

8. A method as in claim 2, wherein the first tenant is used by a first external customer and has a first set of addresses in the first virtual network;
wherein the second tenant is used by a second external customer and has a second set of addresses in the second virtual network;
wherein the first tenant connects to the network at a first port of a first switch and the second tenant connects to the network at a second port of a second switch;
wherein producing the first set of VLAN interfaces within the first network namespace includes assigning a first value of the VLAN identifier to the first port so that requests from the first tenant may be routed to the first network namespace; and
wherein producing the second set of VLAN interfaces within the second namespace includes assigning a second value of the VLAN identifier to the second port so that requests from the second system may be routed to the second network namespace.

9. An electronic apparatus constructed and arranged to operate multitenant applications over networks, the apparatus comprising:
    a network interface coupled to a network;
    memory; and
    controlling circuitry coupled to the memory, the controlling circuitry being configured to run a monolithic application within a default namespace in a context of an operating system running on the server the controlling circuitry being constructed and arranged to:
        generate, in a context of the operating system, a first network namespace and second network namespace in the context of the operating system, the first network namespace and the second network namespace being distinct from one another;
        open (i) a first socket within the first network namespace and (ii) a second socket within the second network namespace;
        receive (i) a first request to access a thread of the application from a first tenant through the first socket and (ii) a second request to access the thread of the application from a second tenant through the second socket;
        transfer, by the processor, data generated by the thread of the application to the first tenant through the first socket; and
        transfer, by the processor, data generated by the thread of the application to the second tenant through the second socket;
    wherein the controlling circuitry constructed and arranged to generate the first network namespace and the second network namespace is further constructed and arranged to:
        produce a first set of virtual local area network (VLAN) interfaces within the first network namespace, each of the first set of VLAN interfaces having a respective value of a VLAN identifier, the VLAN identifier identifying a VLAN over which data may be transported between a tenant and a namespace of the server; and
        produce a second set of VLAN interfaces within the second network namespace, each of the second set of VLAN interfaces having a respective value of the VLAN identifier;
    wherein the first request has a first value of the VLAN identifier and the second request has a second value of the VLAN identifier; and
    wherein the controlling circuitry is further constructed and arranged to:
        route the first request to one of the first network namespace and the second network namespace according to the first VLAN identifier; and
        route the second request to one of the first network namespace and the second network namespace according to the second VLAN identifier.

10. An apparatus as in claim 9, wherein the server includes a set of network interfaces configured to receive requests from tenants, each of the network interfaces having a value of a network interface identifier identifying that network interface;
    wherein the controlling circuitry constructed and arranged to receive the first request to access the thread of the application from the first tenant through the first socket is further constructed and arranged to obtain a first value of the network interface identifier;
    wherein the controlling circuitry constructed and arranged to receive the second request to access the thread of the application from the second tenant through the second socket is further constructed and arranged to obtaining a second value of the network interface identifier;
    wherein the controlling circuitry constructed and arranged to route the first request is further constructed and arranged to send the first request to one of the first network namespace and the second network namespace according to the first value of the VLAN identifier and the first value of the network interface identifier; and
    wherein the controlling circuitry constructed and arranged to route the second request is further constructed and arranged to send the second request to one of the first network namespace and the second network namespace according to the second value of the VLAN identifier and the second value of the network interface identifier.

11. An apparatus as in claim 9, wherein the controlling circuitry constructed and arranged to generate the second network namespace is further constructed and arranged to configure the monolithic application to generate a first virtual data mover (VDM) serving the first network namespace and a second VDM serving the second network namespace, each of the first VDM and second VDM being configured to extract application data from a storage device and respectively present the extracted application data to the first tenant and the second tenant, each of the first VDM and second VDM being run by the server within the default namespace within the server.

12. An apparatus as in claim 9, wherein the controlling circuitry constructed and arranged to generate the second network namespace is further constructed and arranged to create a VLAN table, the VLAN table having entries, each entry of the VLAN table including a value of a namespace identifier identifying a network namespace and a value of the VLAN identifier;
   wherein controlling circuitry constructed and arranged to receive the first request is further constructed and arranged to access an entry of the VLAN table that includes the first value of the VLAN identifier; and
   wherein the controlling circuitry constructed and arranged to route the first request is further constructed and arranged to send the first request to the network namespace identified by the value of the namespace identifier of the accessed entry.

13. A computer program product comprising a non-transitory, computer-readable storage medium which stores executable code, which, when executed by a computer, causes the computer to perform a method of operating multitenant applications over networks, the method comprising:
   generating, by processing circuitry of the server device in a context of the operating system, a first network namespace and second network namespace in the context of the operating system, the first network namespace and the second network namespace being distinct from one another;
   opening (i) a first socket within the first network namespace and (ii) a second socket within the second network namespace;
   receiving (i) a first request to access a thread of the application from a first tenant through the first socket and (ii) a second request to access the thread of the application from a second tenant through the second socket;
   transferring, by the processor, data generated by the thread of the application to the first tenant through the first socket; and
   transferring, by the processor, data generated by the thread of the application to the second tenant through the second socket;
wherein generating the first network namespace and the second network namespace includes:
   producing a first set of virtual local area network (VLAN) interfaces within the first network namespace, each of the first set of VLAN interfaces having a respective value of a VLAN identifier, the VLAN identifier identifying a VLAN over which data may be transported between a tenant and a namespace of the server; and
   producing a second set of VLAN interfaces within the second network namespace, each of the second set of VLAN interfaces having a respective value of the VLAN identifier;
wherein the first request has a first value of the VLAN identifier and the second request has a second value of the VLAN identifier; and
wherein the method further comprises:
   routing the first request to one of the first network namespace and the second network namespace according to the first VLAN identifier; and
   routing the second request to one of the first network namespace and the second network namespace according to the second VLAN identifier.

14. A computer program product as in claim 13, wherein the server includes a set of network interfaces configured to receive requests from tenants, each of the network interfaces having a value of a network interface identifier identifying that network interface;
   wherein receiving the first request to access the thread of the application from the first tenant through the first socket includes obtaining a first value of the network interface identifier;
   wherein receiving the second request to access the thread of the application from the second tenant through the second socket includes obtaining a second value of the network interface identifier;
   wherein routing the first request includes sending the first request to one of the first network namespace and the second network namespace according to the first value of the VLAN identifier and the first value of the network interface identifier; and
   wherein routing the second request includes sending the second request to one of the first network namespace and the second network namespace according to the second value of the VLAN identifier and the second value of the network interface identifier.

15. A computer program product as in claim 13, wherein generating the first network namespace and the second network namespace further includes configuring the monolithic application to generate a first virtual data mover (VDM) serving the first network namespace and a second VDM serving the second network namespace, each of the first VDM and second VDM being configured to extract application data from a storage device and respectively present the extracted application data to the first tenant and the second tenant, each of the first VDM and second VDM being run by the server within the default namespace within the server.

* * * * *